United States Patent [19]

Dotts et al.

[11] 4,151,800

[45] May 1, 1979

[54] THERMAL INSULATION PROTECTION MEANS

[75] Inventors: Robert L. Dotts; Robert J. Maraia; James A. Smith, all of Seabrook; George Strouhal, Friendswood, all of Tex.

[73] Assignee: The United States of America as represented by the Administrator of the National Aeronautics and Space Administration, Washington, D.C.

[21] Appl. No.: 788,045

[22] Filed: Apr. 15, 1977

[51] Int. Cl.² .......................... B32B 9/04; B32B 27/12
[52] U.S. Cl. ...................................... 102/105; 244/121; 244/163; 427/350; 427/372 A; 428/137; 428/282; 428/290; 428/332; 428/447; 428/920
[58] Field of Search ............... 428/111, 137, 282, 290, 428/297, 266, 447, 450, 920, 287; 102/105; 156/329; 106/300, 308 B; 427/372 A, 350; 244/121, 123, 160, 126, 158, 163

[56] References Cited

U.S. PATENT DOCUMENTS

| | | | |
|---|---|---|---|
| 2,684,349 | 7/1954 | Whelton | 428/266 |
| 3,455,732 | 7/1969 | Hathaway, Jr. | 428/447 |
| 3,920,339 | 11/1975 | Fletcher | 428/109 |

Primary Examiner—George F. Lesmes
Assistant Examiner—P. Thibodeau
Attorney, Agent, or Firm—Russell E. Schlorff; John R. Manning; Marvin F. Matthews

[57] ABSTRACT

A system for providing thermal insulation for portions of a spacecraft which do not exceed 900° F. (756° K.) during ascent or reentry relative to the earth's atmosphere. The thermal insulation is formed of relatively large flexible sheets of needled Nomex felt having a flexible waterproof coating. The thickness of the felt is sized to protect against projected temperatures and is attached to the structure by a resin adhesive. Vent holes in the sheets allow ventilation while maintaining waterproofing. The system is heat treated to provide thermal stability.

6 Claims, 6 Drawing Figures

U.S. Patent May 1, 1979 Sheet 1 of 2 4,151,800

THERMAL INSULATION PROTECTION MEANS

ORIGIN OF THE INVENTION

The invention described herein was made by employees of the United States Government and may be manufactured and used by or for the Government of the United States of America for governmental purposes without the payment of any royalties thereon or therefor.

BACKGROUND OF THE INVENTION

This invention relates to an earth reentry thermal protection system material for a specific temperature application and, more particularly, to a smooth coated waterproof thermally stable flexible insulating material, considerably lower in cost and more easily applied compared to materials used in higher temperature zones and which would have been used had not this invention occurred.

Space vehicles are subjected to increases in temperature during ascent and reentry. To protect the metallic structure of the vehicle during such time it is customary to provide a heat shield. During the earlier space programs in which the manned vehicles were used for single trips, the heat shields were formed of ablative material. However, with the advent of the Space Shuttle which uses a vehicle designed to make numerous trips into space, it was necessary to develop a reuseable thermal protection system. The Space Shuttle Orbiter is in some respects similar to a large airplane and consequently various areas of the vehicle are subject to varying surface temperature extremes. For example, the nose and leading edges of the wings are subject to the greatest heating and require a high temperature carbon composite material with internal insulation which provides protection for surface temperatures in excess of 2300° F. (1533° K.). The undersides of the wings and fuselages require a material that will provide protection for surface temperatures up to 2300° F. (1533° K.). Certain portions of the upper side of the fuselage only require protection for surface temperatures up to 1200° F. (922° K.). There are many other portions which require protection to 700° F. (644° K.). It has been determined that highly refined chemically pure silica fibers regidized with a high purity silica binder would be used for all surface areas subjected to 2300° F. (1533° K.), or less. This material is cut into thin, square shaped tiles. The tiles, known as L1-900, are manufactured by Lockheed Missiles & Space Co., Inc. and have relatively low strength, extremely high temperature resistance, and extremely low coefficient of thermal expansion as compared to metals. These tile insulators have a density of 9 pounds/cu.ft. (0.144 Grams/cu. cm.) and generally are effective to repetitive cycles of temperatures to 2300° F. (1533° K.). Because of their relatively low strength, however, the tiles cannot be used for load-bearing applications and must be secured to the protected structure by a means which will minimize transfer of strains from the metal structure to the tile.

An early method for attaching these tiles is disclosed in U.S. Pat. No. 3,920,339 entitled "Strain Arrestor Plate" wherein a strain arrestor plate formed of a material having a similar coefficient of expansion to that of the tile is interposed between the insulating tile and the structure. While this construction solved the problem of thermal expansion, the problem of stress compatability during cold orbital conditions remained. To solve both problems, a strain isolator, made of needled Nomex felt replaced the use of the strain arrestor plate and U.S. Pat. Application Ser. No. 786,913, now U.S. 4,124,733, entitled "Thermal Insulation Attaching Means", which is a continuation-in-part of Ser. No. 555,750, now abandoned, covers such development.

As mentioned before, the rigidized silica tiles were proposed for all areas under 2300° F. (1533° K.) with the thickness of the tiles being determined by the temperature requirements. However, it was found to avoid excessive breakage that the rigized silica tiles could be made no thinner than 0.2 inches (0.508 cm). In many areas the 0.2 inch (0.508 cm) minimum thickness overprotected the areas and created excess weight. Moreover, it was found to be impractical, because of physical characteristics, to make tiles larger than 8 inches × 8 inches (20.32 cm × 20.32 cm) and thus, each of these fragile tiles had to be individually attached to the structure, therefore, installation was most time-consuming and resulted in high breakage rates.

In determining characteristics of the strain isolator noted above, it was discovered that the material had sufficient thermal capacity to insulate against temperatures up to 900° F. (756° K.) but it was not waterproof and had a tendency to shrink after going through temperature cycling. The present invention involves a new and unique use of Nomex felt to overcome the disadvantages of the prior art tile. With the present invention, improved methods and apparatus are herewith provided for obtaining larger sized insulation material with more flexibility and less weight yet provide sufficient temperature isolation for temperatures expected to be encountered by the Space Shuttle orbiter in specific zones.

SUMMARY OF INVENTION

In the present invention, a relatively large 91.4 cm × 182.8 cm flexible sheet of coated Nomex felt is used, for example, three by six feet (91.4 cm × 182.8 cm). The felt is first heat treated at 750° F. (672° K.) to prevent adverse shrinkage upon subsequent exposure to temperatures above 700° (644° K.). A coating of titanium dioxide pigmented silicone resin (with small vent holes) is disposed on the outer surface of the Nomex felt to provide waterproofing and an aerodynamically smooth coating with good thermal optical properties. The inner surface of the Nomex felt is affixed to the structure with an adhesive bonding material. The insulation is good for spacecraft areas which will not exceed 900° F. (756° K.).

The present invention thus involves use of a flexible coating on a flexible insulation to provide a smooth waterproofed surface with good optical properties. Vent holes in the coating allow venting but maintain waterproofing. The insulation and coating are heat treated to provide thermal stability.

These and other features and advantages of the present invention will become apparent from the following detailed description, wherein reference is made to the figures in the accompanying drawings.

DETAILED DESCRIPTION

Figure 5:
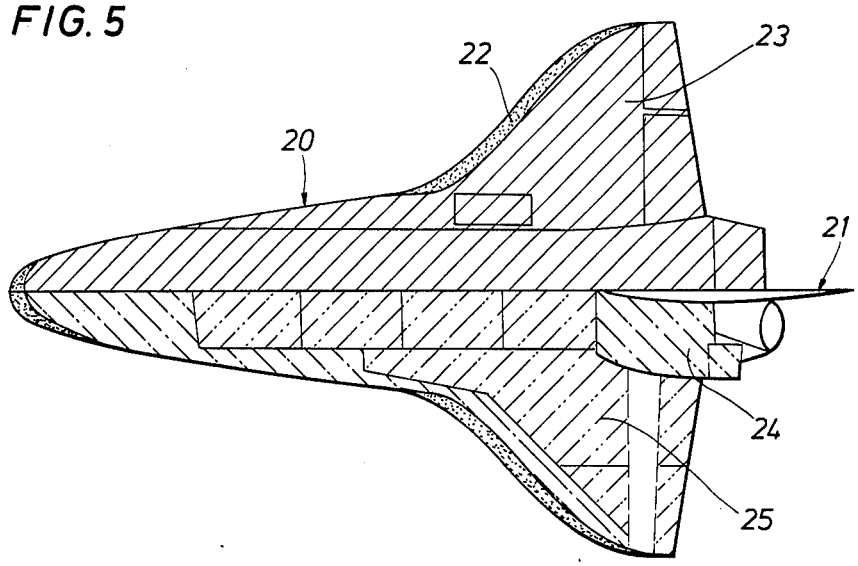
FIG. 5 is a Plan view of a Space Shuttle Orbiter illustrating the thermal protection system.
Figure 6:
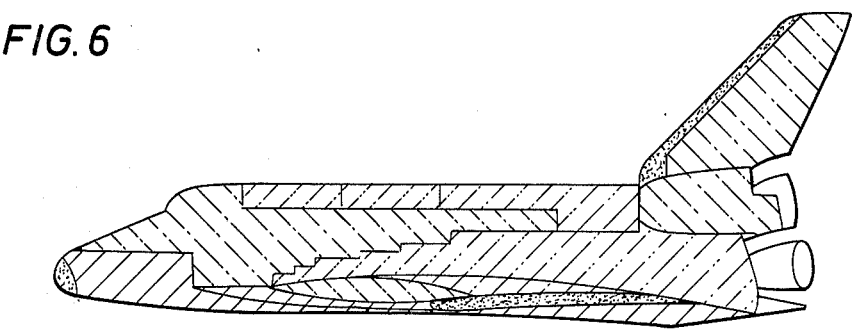
FIG. 6 is a side view of the Orbiter illustrated in FIG. 5.

Referring first to FIGS. 5 and 6, an Orbiter vehicle 20 is illustrated, the portion of the vehicle above the horizontal line 21 representing the lower surface of the vehicle and the portion of the vehicle below the horizontal line 21 representing the upper surface of the vehicle. The line 21 represents a vertical plane through the vehicle. In FIG. 6, a side view of the vehicle is illustrated. The Orbiter vehicle 20 is shaded in four areas with the dotted area representing a coated reinforced carbon-carbon surface area 22, the line shaded area representing a high temperature re-useable surface area 23, the line-dot-line shading representing a low temperature re-useable surface insulation area 24 and the line-dot-dot-line shading representing a flexible re-useable surface area 25. It is surface area 25 which is of prime concern to this invention. The area 22 on the nose cap and leading edges of the wings is capable of withstanding the effects of temperatures in excess of 2300° F. (1533° K.). The area 23 which is most of the lower surface will withstand the effects of surface temperatures in the range of 1200° F. (922° K.) to 2300° F. (1533° K.). The area 24 which is the side surface of the tail and the forward top and sides of the vehicle will withstand the effects of surface temperatures in the range of 700° F. (644° K.) to 1200° F. (922° K.). The area 25 which is the upper surface of the wings, the top and rearward sides of the vehicle will withstand the effects of surface temperatures up to 900° F. (756° K.).

It will be appreciated that area 25 involves a substantial amount of surface area and that the subject surface insulation will withstand 100 reuses to 700° F. (644° K.), about 30 reuses to 750° F., (672° K.), or about 1 reuse to 900° F. (756° K.).

By providing flexible sheets of insulation weight, time and expense are reduced.

Figure 1:
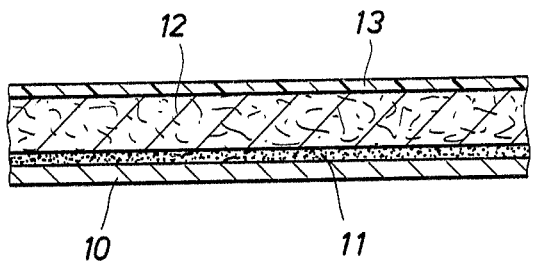
FIG. 1 is a simplified pictorial representation showing the various portions of the composite system.

Referring now to FIG. 1, there may be seen a simplified pictorial representation of the structural surface portion 10 of a vehicle such as a part of the Space Shuttle Orbiter. The numeral 11 designates an adhesive bonding agent (RTV-560) which is a silicone rubber compound made by the General Electric Company and has heat resistant characteristics up to 600° F. (588° K.) and flexibility at −165° F. (170° K.). The thickness of the adhesive 11 is approximately 0.019 cm. The numeral 12 designates a felt pad of Nomex fibers (a trademark "Nomex" of the DuPont Company). Nomex is a poly (1,3-phenylene iso phthalamide) as reported in Textile Research Journal of January 1977, pp. 62–66. The Nomex fibers or other high temperature resistant, flexible, plastic filaments randomly oriented and closely arranged with respect to each other are needled to form a needled felt configuration. Such felt is produced by Globe-Albany, Inc. with one form known as S-2491NRB with "NRB" standing for needled, calendared, and heat seat.

The thickness of the felt pad 12 can typically range between 0.160 inch (0.406 cm) and 0.400 inch (1.016 cm). The numeral 13 designates a titanium dioxide pigmented silicone paint (DC 92-007) made by the Dow Corning Company. The thickness of the paint coating 13 is approximately 0.014 cm. The coating 13 prevents charring of the felt, provides waterproofing for the felt and provides a smooth aerodynamic surface. The coating also provides a low solar absorptance to hemispherical emittance ratio of equal to or less than 0.4. The unit weights for a range of felt from 0.16 inch (0.406 cm) to 0.40 inch (1.016 cm) in thickness is from 0.186 lbs/ft$^2$ (0.09 gms/sq cm.) to 0.294 lbs/ft$^2$ (0.143 gms/sq cm.) which is substantially lighter than any other presently available surface insulation. Ordinarily, the felt 12 thickness requirements are dictated by the heat load, the structural heat sink and the radiation view factor to space. In addition this construction eliminates the task of applying tiles and saves time in installation.

The felt 12 is pre-heat treated by first exposing the felt to incremental heat treatments which are gradually increased to about 750° F. (672° K.). This eliminates subsequent adverse shrinkage and allows most of the volatile materials to be driven off.

Figure 2:
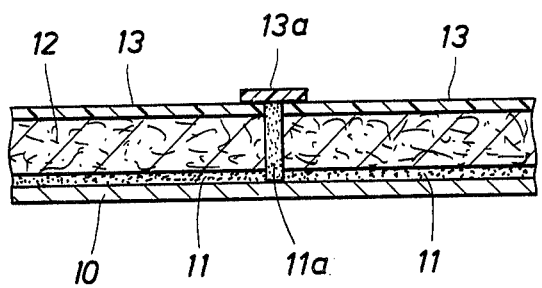
FIG. 2 is a simplified pictorial representation of an exemplary portion of a butt joint illustrating how adjacent insulating portions seal relative to one another.
Figure 3:
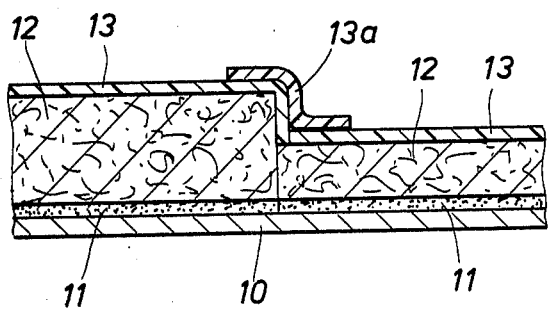
FIG. 3 is a simplified pictorial representation of an exemplary portion of a step joint illustrating adjacent portion sealed relative to one another.
Figure 4:
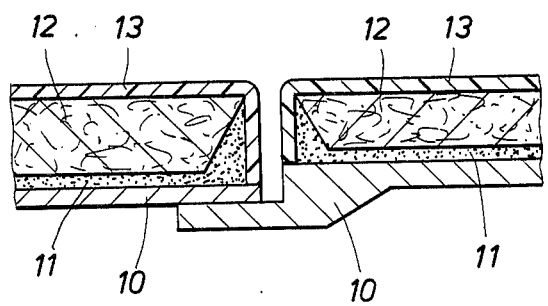
FIG. 4 is a simplified pictorial representation of an exemplary portion of a closeout joint illustrating adjacent portions.

Referring now to FIGS. 2–4, there may be seen a pictorial representation of different edge joining techniques which may be employed. Similar numerals are used to designate similar types of materials referred to in FIG. 1. In the drawing, the numeral 11a designates a bonding agent similar to the agent 11. The numeral 13a designates a coating similar to the agent 13. In FIG. 2 the edge surfaces are butted together and attached by the bonding agent 11a. The juncture of the edges is sealed by a coating 13a. In FIG. 3, the coating 13 of a thicker layer is wrapped around an edge surface and a coating 13a laps over the joint. A bonding agent can be used between the edge surfaces if desired. In FIG. 4, the bonding agent 11 is wrapped around an edge surface and a coating wrapped over the bonding surface. FIGS. 2–4 are typical illustrations of the arrangements that can be employed at the edge surfaces of the pad structures. Thus, it can be seen that in addition to its flexibility and large size sheets, the pad can be easily and surely fastened to adjacent edges.

To prepare the felt, it is cut into large sheets and heat treated to 700° F. (644° K.) for one/half hour and then at 750° F. (672° K.) for one/half hour. A table with a teflon covered surface receives a layer of coating material (DC92-007) at a thickness of 0.007 inches (0.0178 cm). The coating material is cured for one and one/half hours at room temperature at about 40% relative humidity. This will shrink the coating to a thickness of about 0.004 inches (0.0101 cm.) and about 0.003 inches (0.0076 cm.) more of coating material is added. Then the heat treated felt is applied to the coating while it is wet and the felt and coating are vacuum bagged and cured for two hours. Then the vacuum pressure is relieved and the cure is continued for about 22 to 24 hours. Next a post cure is made at 650° F. (616° K.) for 15 minutes.

The process of applying the felt begins with trimming and prefitting the felt sheets of insulation to the frame to be covered. Small diameter air vent holes are made in the coating on regular spacings, for example, 6 inch (15.24 cm.) centers. These holes can be 0.032 inches (0.081 cm.) in diameter. The edges of the felt which will be exposed for closeouts (FIG. 4) are coated with the coating material and cured for 16 to 24 hours. Exposed edges of the felt are coated with DC92-007 and cured from 1.5 to 2 hours. The sheets of felt are then bonded to the frame of the vehicle with the adhesive and cured. The curing is preferably in a vacuum bag for not less than 16 hours at 1.5 to 2.5 pounds per square inch (0.105 to 0.175 Kg/sq. cm.) and room temperature. The joints of the feet are sealed and cured for 16 hours and a final coating is applied and permitted to cure.

The felt sheets are flexible and are easily applied. The bonding agent fixes the sheets to the vehicle and the exterior coating provides a protective shield for the felt. Thus, the concept of the present invention involves the use of a flexible coating on a flexible insulation to provide a smooth surface, waterproofing and surface optical properties. The concept of small vent holes in the coating allows venting but maintains waterproofing. The heat treating of the system provides thermal stability and large sheets with closeouts minimize the installation costs.

Many other variations and modifications may be made in the apparatus and techniques hereinbefore described, both by those having experience in this technology, without departing from the concept of the present invention. Accordingly, it should be clearly understood that the apparatus and methods depicted in the accompanying drawings and referred to in the foregoing description are illustrative only and are not intended as limitations on the scope of the invention.

What is claimed is:

1. Reuseable thermal insulation attached to portions of a space vehicle where surface temperatures will not exceed 900° F. (765° K.) while passing through the atmosphere, comprising:
   a sheet of felt of thermally stable, flexible, insulation material, said felt comprised of needled, high temperature resistant, flexible plastic filaments of poly (1,3-phenylene isophthalamide),
   said sheet being preheat-treated to avoid subsequent adverse shrinkage;
   said felt having a thickness commensurate with the projected thermal environment of the area of the space vehicle being protected, said thickness ranging from approximately 0.406 cm to approximately 1.016 cm,
   said felt having on its exterior face, a layer of titanium dioxide pigmented silicone resin with a minimum thickness of approximately 0.014 cm to provide a smooth optically reflective, flexible, waterproof coating,
   said coating having a plurality of small diameter holes for venting
   said felt sheet being sized and cut into pads configured and contoured for the particular area of the space vehicle to be heat insulated, and
   each of said pads being secured to the surface of the space vehicle by a thin layer of adhesive bond.

2. The reuseable thermal insulation structure described in claim 1, wherein said felt is heated and tested at 700° F. (644° K.) for one half hour and then at 750° F. (672° K.) for one half hour to provide thermal stability.

3. The reuseable thermal insulation structure as described in claim 1 wherein said venting means comprises holes approximately 0.081 centimeters in diameter at about 15.24 centimeter spacings while maintaining waterproofness.

4. The thermal insulation structure described in claim 1, wherein said pad thickness has a range of unit weight from 0.09 gms/sq cm. to 0.143 gms/sq. cm.

5. An improved method for making a thermal insulating pad formed from a felt comprised of needled high temperature resistant, flexible, plastic filaments of poly (1,3-phenylene iso phthalamide), the felt having a thickness ranging from approximately 0.406 cm to approximately 1.016 cm for use as insulation on a space vehicle, said method comprising:
   heat treating said felt composed of closely arranged flexible plastic fibers randomly oriented with respect to each other in incremental steps to a temperature of 750° F. (672° K.) to prevent subsequent adverse shrinkage when the insulation pad is subjected to reentry heat loads.
   curing at ambient room temperature with about 40 percent relative humidity a layer of coating material formed of approximately 0.0178 cm of titanium dioxide pigmented silicone paint for one and one/half hours then adding an additional layer of approximately 0.0076 cm coating material to the air cured coating,
   applying the heat treated felt to the coating while the additional layer is wet;
   curing the assembly under vacuum for two hours,
   relieving the vacuum and continuing the cure for about 22 to 24 hours,
   post-curing the assembly at 650° F. (616° K.) for about 15 minutes.

6. The method described in claim 5, wherein said heat treating is at 700° F. (644° K.) is for one-half hour and is followed by heat treating at 750° F. (672° K.) for one-half hour.

* * * * *

UNITED STATES PATENT AND TRADEMARK OFFICE
CERTIFICATE OF CORRECTION

PATENT NO. : 4,151,800
DATED : May 1, 1979
INVENTOR(S) : Robert L. Dotts, et al

It is certified that error appears in the above-identified patent and that said Letters Patent are hereby corrected as shown below:

On the title page, item /75/ insert 5th inventor's name

-- Ivan K. Spiker, Houston --.

Signed and Sealed this

Fourth Day of September 1979

[SEAL]

Attest:

LUTRELLE F. PARKER

Attesting Officer     Acting Commissioner of Patents and Trademarks